US009563625B2

(12) United States Patent
Bangalore et al.

(10) Patent No.: US 9,563,625 B2
(45) **Date of Patent: *Feb. 7, 2017**

(54) SYSTEM AND METHOD FOR COLLABORATIVE LANGUAGE TRANSLATION

(71) Applicant: AT&T INTELLECTUAL PROPERTY I, LP, Atlanta, GA (US)

(72) Inventors: Srinivas Bangalore, Morristown, NJ (US); Kateryna Kuksenok, Seattle, WA (US)

(73) Assignee: AT&T Intellectual Property I. L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,265

(22) Filed: Mar. 21, 2016

(65) Prior Publication Data

US 2016/0203128 A1 Jul. 14, 2016

Related U.S. Application Data

(63) Continuation of application No. 13/311,836, filed on Dec. 6, 2011, now Pat. No. 9,323,746.

(51) Int. Cl.
*G06F 17/28* (2006.01)
*G06F 3/0484* (2013.01)

(52) U.S. Cl.
CPC ....... *G06F 17/2854* (2013.01); *G06F 3/04842* (2013.01); *G06F 17/289* (2013.01); *G06F 17/2836* (2013.01)

(58) Field of Classification Search
CPC ............ G06F 17/2818; G06F 17/30669; G06F 17/2735; G06F 17/2785; G06F 17/2872; G06F 17/3061; G06F 17/2836; G06F 17/289; G06F 17/24; G06F 3/04886; G06F 17/212; G06F 17/275; G06F 17/2854; G06F 17/3043; G06N 5/022; G06K 9/033
USPC .... 704/2, 4, 5, 9, 3; 707/760; 715/259, 816, 715/261; 709/229; 706/56; 455/566; 345/169, 345/168
See application file for complete search history.

(56) References Cited

U.S. PATENT DOCUMENTS 4,954,984 A 9/1990 Kaijima et al.
5,321,607 A * 6/1994 Fukumochi ........... G06F 17/271 704/4
5,612,872 A 3/1997 Fujita et al.
6,385,568 B1 5/2002 Brandon et al.
7,162,528 B1 * 1/2007 Simonoff ............... G06Q 10/10 709/205
7,539,619 B1 5/2009 Cain et al.
7,877,251 B2 1/2011 Kumaran et al.
7,925,494 B2 4/2011 Cheng et al.
7,983,897 B2 * 7/2011 Chin ..................... G06F 3/0481 704/2

(Continued)

*Primary Examiner* — Michael Colucci

(57) ABSTRACT

Disclosed herein are systems, methods, and non-transitory computer-readable storage media for presenting a machine translation and alternative translations to a user, where a selection of any particular alternative translation results in the re-ranking of the remaining alternatives. The system then presents these re-ranked alternatives to the user, who can continue proofing the machine translation using the re-ranked alternatives or by typing an improved translation. This process continues until the user indicates that the current portion of the translation is complete, at which point the system moves to the next portion.

20 Claims, 7 Drawing Sheets

| Options Presented: | I really like | chewing | burgers | when finally | riding | ~~a home.~~ |
|---|---|---|---|---|---|---|
| | I like | eating | | when | going | home. |
| | I love | | | as I'm | | |
| | | | | upon | | |

520, 518, 522, 522, 522, 522

(56) References Cited

U.S. PATENT DOCUMENTS 8,046,233 B2 * 10/2011 Schurig ............... G06F 17/2288 704/2
8,099,289 B2 * 1/2012 Mozer ..................... G10L 15/30 704/270
8,214,198 B2 * 7/2012 Okura ................. G06F 17/2836 704/2
8,326,598 B1 * 12/2012 Macherey ............. G06F 17/289 704/4
8,543,397 B1 * 9/2013 Nguyen .............. G06F 3/04883 704/235
8,676,562 B2 * 3/2014 Chino ..................... G06F 3/038 704/2
8,838,455 B1 * 9/2014 Fox ......................... G10L 15/30 379/88.01
8,862,475 B2 * 10/2014 Ativanichayaphong G10L 15/265 704/270
2004/0030542 A1 * 2/2004 Fuji ..................... G06F 17/2836 704/2
2004/0122656 A1 * 6/2004 Abir .................... G06F 17/2872 704/4
2004/0205671 A1 * 10/2004 Sukehiro ............. G06F 17/2735 715/259
2005/0021323 A1 * 1/2005 Li ....................... G06F 17/2735 704/5
2006/0123220 A1 * 6/2006 Colson .................. G06F 9/4401 713/1
2006/0190561 A1 * 8/2006 Conboy ............ G06F 17/30864 709/217
2006/0192775 A1 * 8/2006 Nicholson ................ A61F 4/00 345/211
2006/0259462 A1 * 11/2006 Timmons .......... G06F 17/30979
2007/0203688 A1 * 8/2007 Fuji ......................... G06F 17/28 704/2
2007/0294076 A1 * 12/2007 Shore .................. G06F 17/2836 704/2
2008/0195571 A1 * 8/2008 Furuuchi ............... G06F 17/276 706/56
2009/0037401 A1 2/2009 Li et al.
2009/0076792 A1 * 3/2009 Lawson-Tancred .. G06F 17/212 704/2
2009/0192786 A1 * 7/2009 Assadollahi .......... G06F 3/0234 704/9
2009/0326913 A1 12/2009 Simard et al.
2010/0004920 A1 * 1/2010 Macherey ........... G06F 17/2818 704/4
2011/0022381 A1 1/2011 Gao et al.
2011/0066634 A1 * 3/2011 Phillips ................... G10L 15/22 707/769
2011/0087961 A1 * 4/2011 Fitusi .................... G06F 17/276 715/261
2011/0105190 A1 5/2011 Cha et al.
2011/0202876 A1 * 8/2011 Badger ................. G06F 3/0237 715/816
2011/0288851 A1 * 11/2011 Duan ...................... G06F 17/28 704/3
2011/0320185 A1 * 12/2011 Broshi ................ G06F 17/2818 704/4
2012/0206367 A1 * 8/2012 Griffin .................. G06F 3/0237 345/169
2012/0233196 A1 * 9/2012 Wu .................. G06F 17/30669 707/760
2012/0253785 A1 * 10/2012 Hamid ................ G06F 17/2229 704/4
2012/0311476 A1 * 12/2012 Campbell ........... G06F 3/04886 715/773
2013/0033523 A1 * 2/2013 Stovicek ............. G06F 17/2288 345/649
2013/0054222 A1 * 2/2013 Sharma .............. G06K 9/00442 704/2
2013/0124185 A1 * 5/2013 Sarr ...................... G06F 17/289 704/2
2013/0246179 A1 * 9/2013 Shrock ................... G06Q 30/00 705/14.58
2013/0279744 A1 * 10/2013 Ingrassia, Jr. ........... G06F 21/32 382/103
2014/0104175 A1 4/2014 Ouyang et al.
2014/0122057 A1 * 5/2014 Chelba .................. G06F 17/276 704/9
2014/0365865 A1 * 12/2014 Ivory .................. G06F 17/2247 715/234
2015/0116341 A1 * 4/2015 Kenmochi ............... G09G 3/20 345/536

* cited by examiner

100
STORAGE DEVICE
160
MOD 1
MOD 2
MOD 3
162
164
166
BUS
110
RAM
150
ROM
140
MEMORY
130
PROCESSOR
120
CACHE
122
INPUT DEVICE
190
OUTPUT DEVICE
170
COMMUNICATION INTERFACE
180

500

| | 508 | 508 | 508 | 508 | 508 | 508 |
|---|---|---|---|---|---|---|
| 502 **Machine Translation:** | I have really liked | to eat | hamburgers | when I'm | driving | to a house. |
| | 512 | 512 | 512 | 512 | 512 | 512 |
| 504 **Options Presented:** | I really like | chewing | burgers | when finally | riding | a home. (514) |
| | I like | eating | | when | going | home. (516) |
| | I love | | | as I'm | | |
| | | | | upon | | |
| 506 **Final Version (as currently selected)** | I have really liked | to eat | hamburgers | when I'm | driving | to a house. |
| | 510 | 510 | 510 | 510 | 510 | 510 |

| Options Presented: | I really like | chewing | burgers | when finally | riding | ~~a home.~~ |
|---|---|---|---|---|---|---|
| | I like | eating | | when | going | home. |
| | I love | | | as I'm | | |
| | | | | upon | | |

| 502 Machine Translation: | I have really really | to eat | hamburgers | when I'm | driving | to a house. |
|---|---|---|---|---|---|---|

| 524 Options Presented: | I like | eating | burgers | when | riding | |
|---|---|---|---|---|---|---|
| | I love | chewing | | as I'm | going | home |
| | I really like | | | upon | | |
| | | | | when finally | | |

528

| 526 Final Version (as currently selected) | I have really liked | to eat | hamburgers | when I'm | driving | home. |
|---|---|---|---|---|---|---|

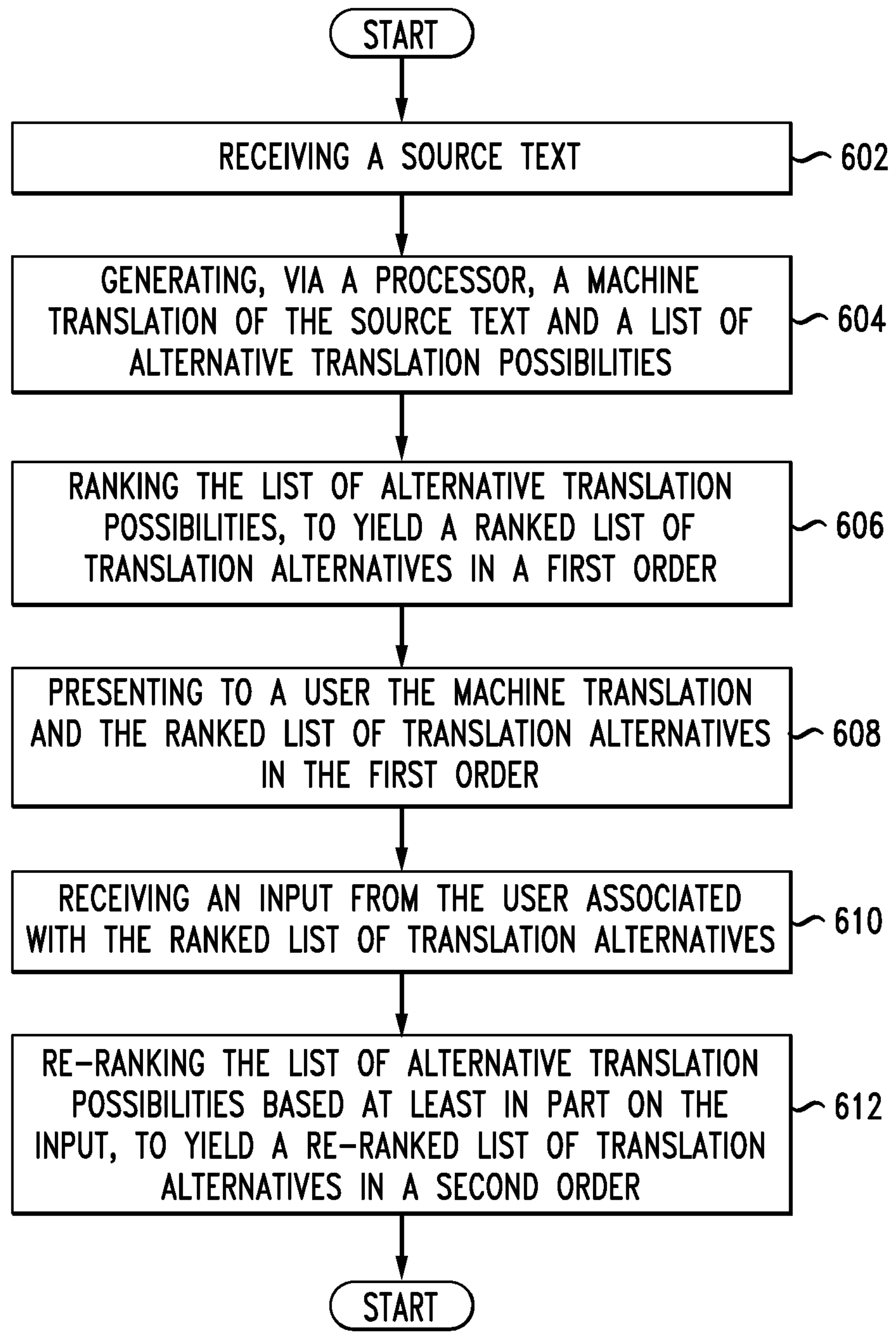
FIG. 6
START
RECEIVING A SOURCE TEXT
602
GENERATING, VIA A PROCESSOR, A MACHINE TRANSLATION OF THE SOURCE TEXT AND A LIST OF ALTERNATIVE TRANSLATION POSSIBILITIES
604
RANKING THE LIST OF ALTERNATIVE TRANSLATION POSSIBILITIES, TO YIELD A RANKED LIST OF TRANSLATION ALTERNATIVES IN A FIRST ORDER
606
PRESENTING TO A USER THE MACHINE TRANSLATION AND THE RANKED LIST OF TRANSLATION ALTERNATIVES IN THE FIRST ORDER
608
RECEIVING AN INPUT FROM THE USER ASSOCIATED WITH THE RANKED LIST OF TRANSLATION ALTERNATIVES
610
RE-RANKING THE LIST OF ALTERNATIVE TRANSLATION POSSIBILITIES BASED AT LEAST IN PART ON THE INPUT, TO YIELD A RE-RANKED LIST OF TRANSLATION ALTERNATIVES IN A SECOND ORDER
612
START

SYSTEM AND METHOD FOR COLLABORATIVE LANGUAGE TRANSLATION

CROSS-REFERENCE TO RELATED APPLICATIONS

This application is a continuation of and claims priority to U.S. patent application Ser. No. 13/311,836, filed Dec. 6, 2011. The contents of the foregoing is hereby incorporated by reference into this application as if set forth herein in full.

FIELD OF THE DISCLOSURE

The present disclosure relates to machine translations and more specifically to presenting a machine translation and alternative translations to a user, where a selection by the user of an alternative re-ranks other alternatives.

INTRODUCTION

Translators are valuable tools in optimizing time and ability to function. Professional human language translators, both historically and today, present value in their services by overcoming an impasse of communication. The service of a translator allows people to engage in commerce and communicate in situations where they otherwise could not. With the advent of modern computing, computers have the ability to generate machine translations of text, which reduces the time necessary for translation but also presents possible incorrect translations. Unfortunately, the only way in the current state of the art to truly account for these possibly incorrect translations is to hire a human translator. This translator's task is to check the machine translation for errors, nuance, and only in rare situations actually translate from the original text.

Employing a human translator to correct for any possible errors in the machine translation appears, at present, to be unavoidable. While machine translations can and will continue to improve, achieving greater translation efficiency at present relies on increasing the speed and accuracy of the human translator checking the machine translation. One way of increasing human speed and accuracy is presenting alternative translation options to the translator, from which the translator can select replacement words, phrases, sentences, or other text sections in the machine translation.

BACKGROUND OF THE DISCLOSURE

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for presenting a machine translation and alternative translations to a user, where a selection of any particular alternative translation results in the re-ranking of the remaining alternatives. The system then presents these re-ranked alternatives to the user, who can continue proofing the machine translation using the re-ranked alternatives or by providing an improved or alternate translation. This process continues until the user indicates that the current portion of the translation is complete, at which point the system moves to the next portion. The determination that a portion is complete can be decided by direct or indirect input from the user, upon reaching a certain level of confidence, or receiving confirmation from the user that each portion is translated correctly.

As an example, a system configured to practice the method of this disclosure generates a machine translation of a source text as well as a list of alternative translation possibilities. The system then ranks the list of alternative translation possibilities and presents the machine translation and the alternative translation possibilities to a user, who selects the machine translation or one of the alternatives as the preferred translation, or enters a their own translation. The user can be a participant in a collaborative translation of the source text with at least one other human and/or computer-based entity. If the user selects one of the alternative translations listed, the system re-orders or recreates the alternative translations list in a new order based on the user selection.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 5A, 5B, and 5C illustrate presentation of alternative translations, re-ordering those translations, and presentation of re-ordered alternative translations, respectively; and FIG. 6 illustrates an example method embodiment.

DETAILED DESCRIPTION OF THE DRAWINGS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved machine translation proofing by a human. A system, method and non-transitory computer-readable media are disclosed which present a machine translation along with alternative translation possibilities, where the alternative translation possibilities are re-ordered depending upon selection by a user of one of the alternative translation presented. A brief introductory description of a basic general purpose system or computing device in FIG. 1 which can be employed to practice the concepts is disclosed herein. A more detailed description of dynamically presenting alternative translation options will then follow, accompanied by descriptions of various embodiments. The disclosure now turns to FIG. 1.

Figure 1:
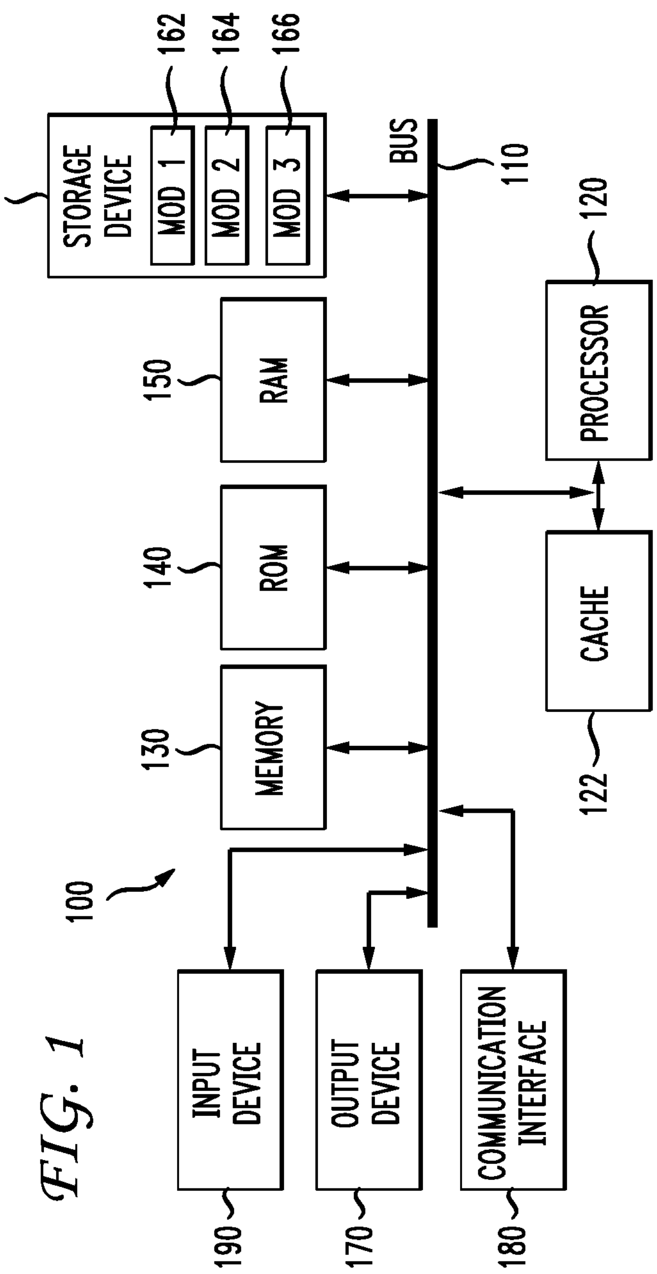
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
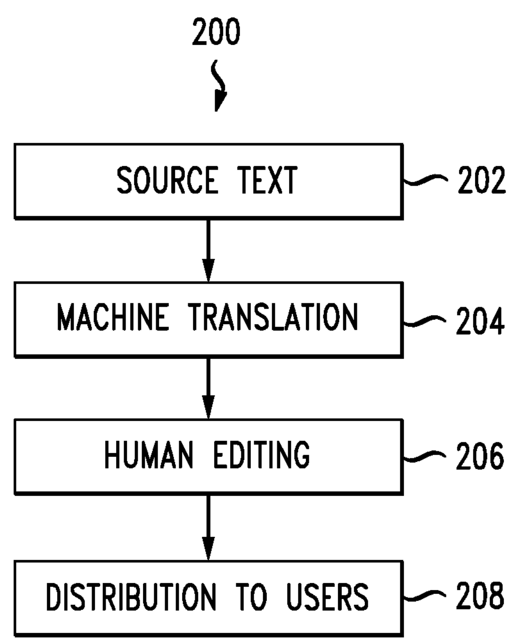
FIG. 2 illustrates an example method of machine translation.

Having disclosed some components of a computing system, the disclosure now turns to FIG. 2, which illustrates an example method of machine translation 200. According to this method, a computer or computing device translates a source text 202 into a machine translation 204. Because machine translations are not perfect, a human translator uses the machine translation as a basis for human editing 206, where the translator can correct for any vocabulary, nuance, or other translation errors made by the computer. Once the translator considers the translation complete, distribution of the translation to various users occurs 208.

This translation method 200 transfers the bulk of the translation work to the machine, shifting the role of a human translator to one of confirmation, editing, or proof reading the machine translation. The human translator in this new role can be an expert or a non-expert, and can have a knowledge of the source language and the target language or just the target language. This method 200 provides quality translations between spoken languages, such as from English to Spanish, French to German, etc. The same translation process applies to computer compilers, where a compiler translates code written in a language understood by humans into intermediate code, optionally further optimizes that code, and translates the intermediate code into machine executable code. In the process of these computer code translations, human beings can optimize machine translations by tweaks or changes to the intermediate code or the final machine code. These modifications can improve the size, speed, security, or other aspects of the code. In this example, the human user can see how one change in the intermediate code affects other portions of the code in real time.

Figure 3:
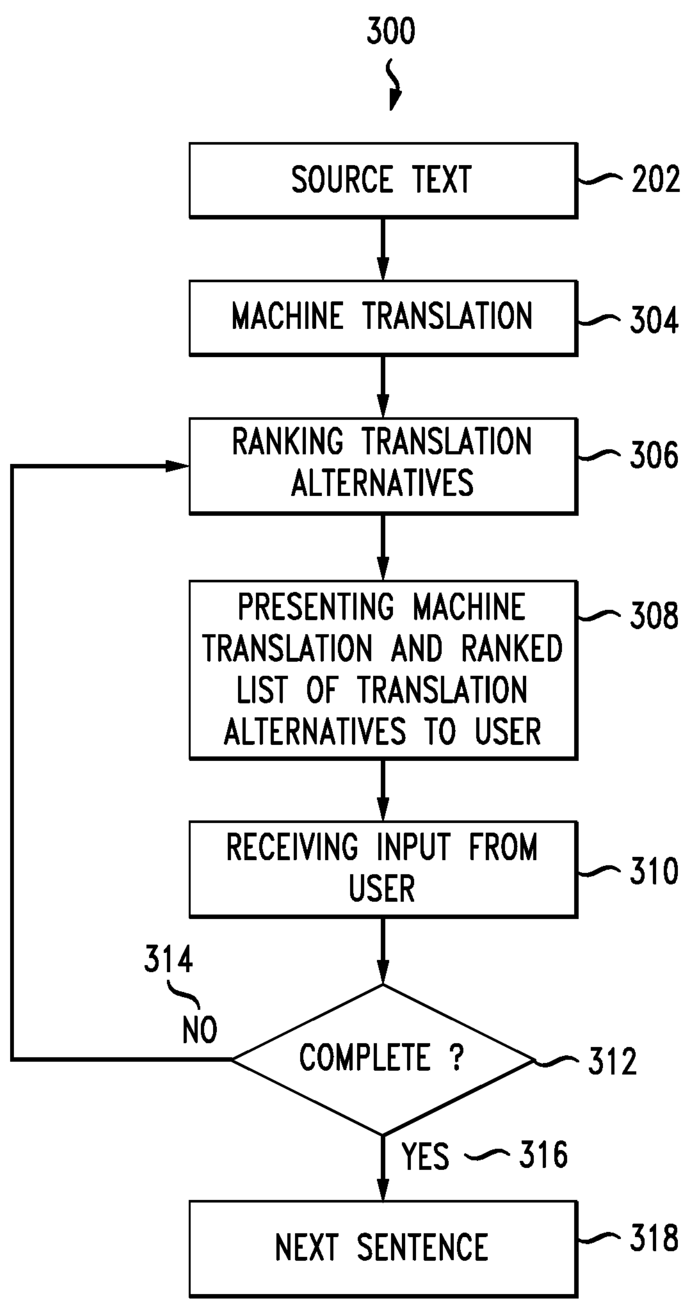
FIG. 3 illustrates a decision tree of an example method embodiment.

FIG. 3 illustrates a decision tree of an example method embodiment 300. As in the translation method 200 of FIG. 2, here a system configured according to this disclosure first receives a source text 302 to translate. Upon translating the source text into a machine text 304 via a computer or computing device, the system creates a ranked list of alternative translations 306. The system then presents the machine translation of a single portion or multiple portions, up to and including the entire document, and the ranked list of alternative translations of that portion to a human translator 308. The human translator can then review the machine translation and determine if the translation is complete or if the translation needs modification 312, indicated by the system receiving explicit or implicit input from the user 310. If the input from the user explicitly indicates that the translation is complete 316, the system proceeds to the next portion 318. If the translator instead provides input, such as entering their own translation of the source text or selecting from one of the alternative translations presented, this 'Not Complete' 314 explicit response initiates a return to ranking translation alternatives 306. Alternatively, if the system relies upon a threshold to determine if the portion is complete, the system can return an implicit completeness upon determining that the machine translation and the alternatives selected meet or exceed the threshold. The system then ranks translation alternatives using the newly entered input from the user in addition to the original machine translation, creating a new list of ranked alternative translations.

The ranked list of translation alternatives presented to the user with the machine translation 308 can be all alternative translations possible, only the top ranked translation alternatives, or only those alternative translation possibilities whose probability of being a likely alternative exceeds a threshold. The user can be a participant in a multi-party collaborative translation effort to translate the source text. For example, the user can be one participant in a group of human and/or computer-based translators who are each translating at least a part of the source text. The various participants can be aware of each other's participation and work close together, or can work completely independently. The participants may not even know of each other's existence, and still collaborate by virtue of working to translate a common source text. The threshold can vary dynamically depending upon the number of potential alternatives and settings established by the user or the system. For example, the system can determine that five alternatives should be presented based on the translated portion and the number of alternatives having a certain probability. The user can then adjust this to present seven alternatives because the user prefers more choices, or adjust it to only two alternatives because the translator trusts the machine translation or dislikes the alternatives presented. For example, rather than showing the top five alternative translations, which may or may not be helpful translations, the system will only present translation alternatives having a minimum 60% probability of correctness. Ranking the probable translation alternatives can be done based on the likelihood that the translation alternative is to be used, the usage of the alternative in previous translations, the usage of the alternative within this translation, or the usage of the alternative by this translator in previous translations. The ranking can also be determined using crowdsourcing/historical models from a wide range of translators, or translations concerning a specific topic or subject area.

The alternative translations in the case of translation from one language to another, such as from English to Spanish, can be words, sentences, paragraphs, or other phonetically meaningful portions. In the case of translation from a higher level language, such as C++, to an intermediary assembly language, the portions can be a single command, a cluster of commands, or a reference to an alternative. For instance, if the alternative translation is too large to easily view, the system can present a description of the changes present in the alternative and the advantages for making the change.

From a user perspective, upon selecting an alternative translation option the other translation alternatives update using the previous translation and the most recent input. To the user, this update seems nearly instantaneous. Without the user's knowledge, the system determines a new list of alternative translations based on the previous machine translation, the alternative translation selected, and any other relevant factors. The system then presents this new list of alternative translations to the user and allows the user to continue to adjust the translation as desired.

Figure 4A:
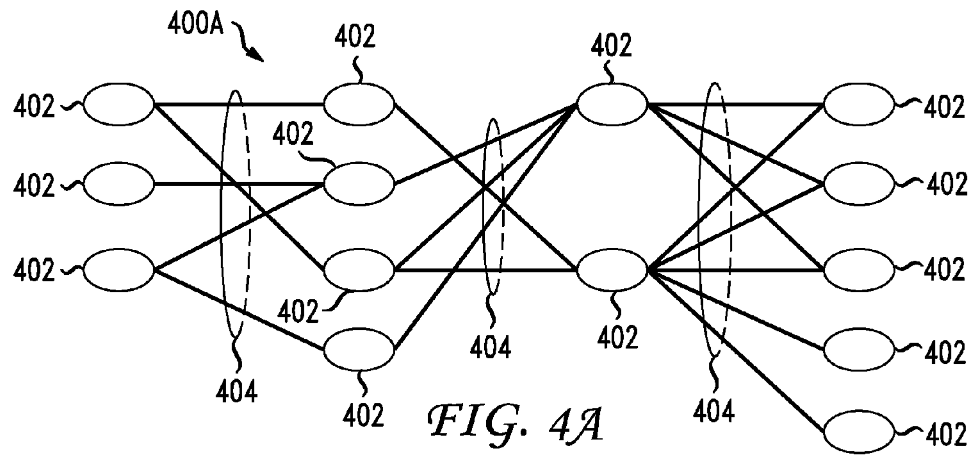
FIGS. 4A, 4B, and 4C illustrate node interconnectivity.
Figure 4B:
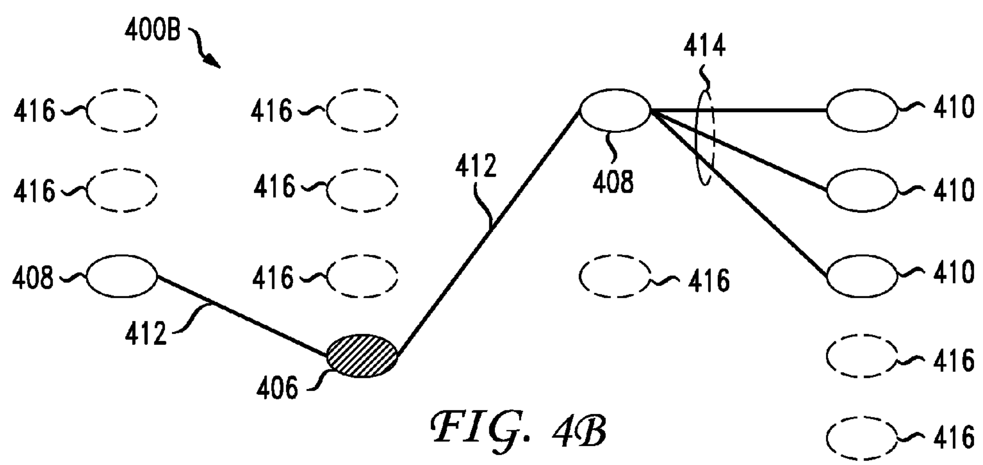
Figure 4C:
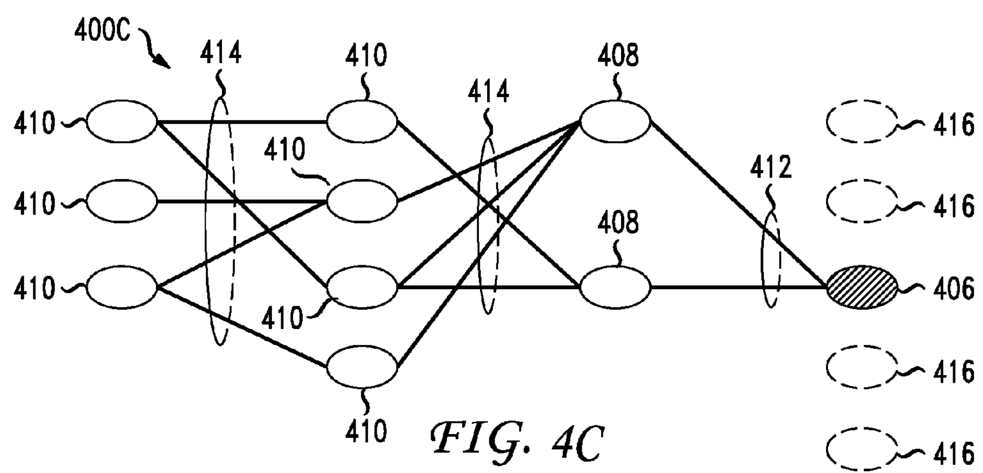

FIGS. 4A, 4B, and 4C illustrate node interconnectivity. In FIG. 4A, the nodes 402 are connected by lines 404, and represent node interconnectivity with no selection made 400A. Each node 402 represents an alternative translation portion, and each line 404 represents a relationship between nodes. For this illustration, each line 404 illustrates a binary relationship between nodes. That is, if the line 404 is present between two nodes then they are likely to co-exist within the translation, and if the line 404 is not present than the existence of either one of the nodes in the translation will eliminate the other from occurrence. In other embodiments, these lines can be weighted, such that nodes connect to all other nodes, but those connections are weighted to change the probability of use based on the node selected. If illustrated, every node 402 would connect 404 to every other node 402, creating a network of relative probability. However, even within this probability network no connectivity 404 exists between alternatives of a specific portion. As illustrated, each node 402 represents a possible alternative translation of a source text, with each column of nodes 402 representing the alternative translations for that specific portion.

FIG. 4B illustrates the node interconnectivity of FIG. 4A, with a selection 406 made 400B. The selected node 406 continues to have binary lines 412 connecting the selected node 406 to neighboring nodes 408. From some of those neighboring nodes 408 that connect to the selected node 406, there are other possible nodes 410 connected by an additional binary line 414. Those nodes without a direct connection 412 or a secondary connection 414 to the selected node become eliminated nodes 416. The remaining nodes 408, 410 are presented with the selected node 406 as an updated list of alternative translations.

FIG. 4C similarly shows the node interconnectivity of FIG. 4A, with a different node selected 406 than in FIG. 4B. In FIG. 4C, because the node selected 406 is on the edge, and connects directly 412 to both of the adjacent nodes 408 in the neighboring column, every node 408, 410 outside of the selected node 406 column is still selectable by the user. The only nodes eliminated are the nodes 416 in the same column as the selected node 406.

FIGS. 5A, 5B, and 5C illustrate presentation of alternative translations, re-ordering those translations, and presentation of re-ordered alternative translations, respectively. FIG. 5A illustrates the presentation of a machine translation 502 of a sentence to a human translator, accompanied by translation alternatives 504 and a display of the final version as currently selected 506 by the translator. The system has divided the machine translation 502 into specific portions 508, with corresponding columns of alternative translations 512, as well as corresponding sections in the final version as currently selected 510. The alternative translations 512, in this example, are arranged such that the top alternative translation is the most likely alternative, and the bottom alternative translation is the least likely alternative. In other configurations the options arrangement can be determined based on the translator preference, results from crowd sourcing, historical trends, geographic preferences, intended audience, and/or phonetic flow. For example, the system can utilize crowdsourcing by recording data from multiple translators concerning when and how often translators choose specific alternatives as replacements for machine translations. Based on this data, the system can determine that certain alternative translations have higher or lower probabilities of being selected under specific circumstances, and based on those higher or lower probabilities rank the alternatives accordingly. Historical trends can be formed from a single user, a specific locality, region, demographic, or other group of relevant translation data.

As the human translator is viewing these options 504 in relation to the original text and the machine translation 502, they can make a selection. In this case, the translator is considering two alternatives to the portion "to a house", namely "a home" 514 and "home" 516. The translator selects "home" 516 to replace "to a house". Upon selecting an alternative translation, the system modifies the options presented 504. This modification is shown in FIG. 5B.

FIG. 5B illustrates an example of how the system modifies the ranked list of translation alternatives upon the selection of the alternative translation "home" 518 by the translator. In the case of the other alternative "a home" 520 in the same column as the selection 518, it is removed from consideration. In other configurations, the alternatives for the same portion as the selection 518 can remain as additional translation alternatives after making a selection. This can be useful if the translator is considering more than one alternative, or wants to test one alternative before ultimately selecting a different alternative. In the illustrated configuration, re-ordering 522 of the remaining alternatives causes a shift in the positioning of the alternative translations, such that several of the most likely translation alternatives are now the least likely alternatives presented, and the remaining alternatives have shifted one place closer to the most likely alternative presented.

FIG. 5C illustrates the presentation to the translator of the translation and translation alternatives after re-ordering the translation alternatives following the selection of "home" 528 by the translator. The machine translation 502 remains identical to the machine translation of FIG. 5A, because the source text was not re-translated. The machine translation 502 remains constant as a base from which the translator can compare the current revision 526 to the original machine translation 502. The current revision, or Final Version 526, is the original machine translation with portions replaced by any selections 528 or corrections made by the translator. In this example, the only change between the machine translation 502 and the current revision is that "to a house" has been replaced with "home" in the final portion of the sentence, based on the selection of "home" 528 in the options presented 528. Many of the remaining alternative translations shown in the Options Presented 524 are in a different order than originally presented 504 in FIG. 5A, based on the changes made and illustrated in FIG. 5B. This process of presenting a machine translation and translation alternatives to a human translator, receiving input using the translation alternatives presented or input directly from the human translator, and updating the translation alternatives can continue until receiving input from the translator that the translation is sufficiently accurate. At that point, the system can present the next translation segment and its associated translation alternatives to the translator.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives a source text (602) and generates a machine translation of the source text accompanied by a list of alternative translation possibilities (604). The system 100 then ranks the list of alternative translation possibilities, yielding a ranked list of translation alternatives in a first order (606). The machine translation and the ranked list of translation alternatives in the first order are presented to a user (608), wherein the user is participating in a collaborative translation of the source text with at least one other entity, at which point the system receives an input from the user associated with the ranked list of translation alternatives (610). This input can be one of the alternatives, or can be an alternative translation entered by user not previously presented by the system 100. For example, the user can select one of the alternatives, or write in their own alternative translation. The system 100 then re-ranks the list of alternative translation possibilities based at least in part on the input, to yield a re-ranked list of translation alternatives in a second order (612). The system 100 can then present this re-ranked list of translation alternatives in a second order, the input, and the machine translation to the user. In one variation, the system can not only re-order the translation alternatives for one user, but for other users in the collaborative translation effort. For example, if a first user enters input which affects the order or rank of the list of alternatives, the system can propagate those changes to other users' lists as well, or can propagate other changes or rank adjustment parameters to other users' lists based at least in part on the input from the first user. In this manner, the efficiency of the collaborative translation can be enhanced, even if participants in the collaborative translation effort are in different locations, or are working at different, non-overlapping times.

In one configuration, the system 100 ranks the list of alternative translation possibilities based on the likelihood of the user selecting each translation alternative. This likelihood of selection can be determined from historical trends, crowdsourcing, or previous usage associated with the source text. For example, if a user/translator proofing a machine translation of a specific source text has selected a specific alternative translation multiple times while editing the specific source text, the system 100 can increase the likelihood of subsequent selections in the future and increase the probability for selection of those alternative translations.

The alternative translation possibilities correspond to specific portions of the machine translation. Depending upon the configuration, the system 100 can dynamically adjust the size of the specific portions, or the system 100 can have a fixed portions corresponding to words, phrases, sentences, prosaically meaningful phrases, or paragraphs. If the source text being translated is a higher level computing language, and the machine translation is an intermediate, machine code language, the portions can be individual machine code lines or clusters of lines.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to spoken language translations and computer language translations. Those skilled in the art will readily recognize various modifications and changes that may be made to the principles described herein without following the example embodiments and applications illustrated and described herein, and without departing from the spirit and scope of the disclosure.

What is claimed is:

1. A method comprising:

presenting, by a system comprising a processor and to equipment of a first user, a ranked list of translation possibilities in a first order, and a list of alternative translation possibilities, wherein the ranked list of translation possibilities and the list of alternative translation possibilities comprise machine translations of a source text in an original language distinct from the machine translations, wherein the ranked list of translation possibilities and the list of alternative translation possibilities are contemporaneously presented to equipment of a second user, allowing the first user and the second user to participate in a collaborative translation of the source text;

detecting, by the system, an input from the equipment of the first user, the input identifying a translation possibility from the list of alternative translation possibilities;

re-ranking, by the system, the ranked list of translation possibilities in the first order based on the input, to yield a re-ranked list of translation possibilities in a second order;

providing, by the system, the re-ranked list of translation possibilities to the equipment of the first user; and facilitating a transfer, by the system, of the re-ranked list of translation possibilities to the equipment of the second user for display, wherein the re-ranked list of translation possibilities is presented contemporaneously to both the equipment of the first user and the equipment of the second user.

2. The method of claim 1, further comprising providing, by the system and to the equipment of the first user, the machine translation, the input, and the re-ranked list of translation possibilities in the second order.

3. The method of claim 1, wherein a ranking of the list of alternative translation possibilities is based on a likelihood of each translation alternative of the ranked list of translation possibilities being selected by the equipment of the first user.

4. The method of claim 3, wherein the likelihood of each translation alternative being selected by the equipment of the first user is determined from one of historical trends, crowdsourcing, previous usage associated with the source text, or a combination thereof.

5. The method of claim 1, wherein the list of alternative translation possibilities comprises alternative portions associated with machine translation portions.

6. The method of claim 5, wherein the machine translation portions comprise one of a line of machine code and a cluster of machine code lines.

7. The method of claim 1, wherein the input from the equipment of the first user comprises one of a selection from the ranked list of translation possibilities and a non-predetermined translation alternative from the equipment of the first user.

8. A system comprising:

a processor; and a memory that stores executable instructions that, when executed by the processor facilitate performance of operations comprising:

presenting, to equipment of a first user, a ranked first list of alternative translation possibilities in a first order, and a second list of alternative translation possibilities of a source text, wherein the ranked first list of alternative translation possibilities and the second list of alternative translation possibilities comprise machine translations of the source text in a language distinct from an original language of the source text, wherein the ranked first list of alternative translation possibilities and the second list of alternative translation possibilities are contemporaneously presented to equipment of a second user allowing the first user and the second user to participate in a collaborative translation of the source text;

detecting an input from the equipment of the first user, the input identifying a translation possibility from the second list of alternative translation possibilities;

re-ranking the ranked first list of alternative translation possibilities in the first order based on the input, to yield a re-ranked first list of alternatives translation possibilities in a second order;

presenting the re-ranked first list of alternative translation possibilities to the equipment of the first user; and facilitating transfer of the re-ranked first list of translation alternatives to the equipment of the second user for display, wherein the re-ranked first list of alternative translation possibilities is presented to simultaneously both the equipment of the first user and the equipment of the second user.

9. The system of claim 8, wherein the operations further comprise presenting to the equipment of the first user the machine translation, the input, and the re-ranked list of translation possibilities in the second order.

10. The system of claim 9, wherein a ranking of the list of alternative translation possibilities is based on a likelihood of each translation alternative being selected by the equipment of the first user.

11. The system of claim 10, wherein the likelihood of each translation alternative being selected by the equipment of the first user is determined from one of historical trends, crowdsourcing, previous usage associated with the source text, and combinations thereof.

12. The system of claim 8, wherein the list of alternative translation possibilities comprises alternative portions associated with machine translation portions.

13. The system of claim 12, wherein the machine translation portions comprise one of a line of machine code and a cluster of machine code lines.

14. The system of claim 8, wherein the input from the equipment of the first user comprises one of a selection from the ranked list of translation alternatives and a non-predetermined translation alternative from the first user.

15. A non-transitory machine-readable storage medium comprising instructions stored which, when executed by a processor, cause the processor to perform operations comprising:

presenting, to equipment of a first user, a machine translation, a ranked list of translation possibilities in a first order, and a list of alternative translation possibilities, of a source text, wherein the ranked list of translation possibilities and the list of alternative translation possibilities comprise machine translations of the source text in a language distinct from an original language of the source text, wherein the ranked list of translation possibilities and the list of alternative translation possibilities are contemporaneously presented to equipment of a second user allowing the first user and the second user to participate in a collaborative translation of the source text from the original language to an other distinct language;

determining an input from the equipment of the first user, the input identifying a translation possibility from the list of alternative translation possibilities;

re-ranking the ranked list of translation possibilities in the first order based on the input, to yield a re-ranked list of translation possibilities in a second order;

presenting the re-ranked list of translation possibilities to the equipment of the first user; and transmitting the re-ranked list of translation possibilities to the equipment of the second user for display to the equipment of the second user, wherein the re-ranked list of translation possibilities is presented contemporaneously to both the equipment of the first user and the equipment of the second user.

16. The non-transitory machine-readable storage medium of claim 15, wherein the operations further comprise presenting to the equipment of the first user the machine translation, the input, and the re-ranked list of translation possibilities in the second order.

17. The non-transitory machine-readable storage medium of claim 16, wherein ranking the list of translation possibilities is based on a likelihood of each translation alternative being selected by the equipment of the first user.

18. The non-transitory machine-readable storage medium of claim 17, wherein the likelihood of each translation alternative being selected by the equipment of the first user is determined from one of historical trends, crowdsourcing, previous usage associated with the source text or a combination thereof.

19. The non-transitory machine-readable storage medium of claim 15, wherein the list of alternative translation possibilities comprises alternative portions associated with machine translation portions.

20. The non-transitory machine-readable storage medium of claim 19, wherein the machine translation portions comprise one of a line of machine code and a cluster of machine code lines.

* * * * *